United States Patent [19]

Solum et al.

[11] 4,134,835

[45] Jan. 16, 1979

[54] STEAM INJECTION ASSEMBLY FOR DISC FILTER

[75] Inventors: Dallas Solum, Salt Lake City; Steven S. Davis, Bountiful, both of Utah

[73] Assignee: Envirotech Corporation, Menlo Park, Calif.

[21] Appl. No.: 783,098

[22] Filed: Mar. 31, 1977

[51] Int. Cl.² ........................................... B01D 35/18
[52] U.S. Cl. .................................... 210/178; 210/331
[58] Field of Search .................. 210/68, 77, 178, 179, 210/330, 331, 390, 395, 402, 406

[56] References Cited

U.S. PATENT DOCUMENTS

| | | | |
|---|---|---|---|
| 2,742,177 | 4/1956 | Watson | 210/68 X |
| 3,190,451 | 6/1965 | Holland | 210/406 X |
| 3,245,538 | 4/1966 | Leonard | 210/331 X |
| 3,361,259 | 1/1968 | von der Gathen et al. | 210/68 X |
| 3,592,341 | 7/1971 | Emmett, Jr. et al. | 210/68 |
| 3,698,556 | 10/1972 | Emmett, Jr. et al. | 210/178 |
| 3,969,247 | 7/1976 | Emmett, Jr. et al. | 210/68 |

*Primary Examiner*—Robert H. Spitzer
*Attorney, Agent, or Firm*—William S. Bernheim; Robert E. Krebs

[57] ABSTRACT

Apparatus is disclosed for steam drying a cake of filtered solids formed on a filter element of a rotary disc vacuum filter where the disc filter element is mounted for rotation in a container, the lower portion of which includes a slurry tank and the upper portion of which includes a steam hood. The steam hood encloses a portion of the filter element in a steam chamber and includes tubular members which are connected to support the steam hood walls and which serve as an element of an introduction means for conveying steam into the chamber.

5 Claims, 6 Drawing Figures

STEAM INJECTION ASSEMBLY FOR DISC FILTER

FIELD OF THE INVENTION

This invention relates generally to pressure differential filtration, and, in particular to filtration wherein a relatively dryer filter cake is obtained during drying by passing steam into filter cake formed on a filter.

STATE OF THE ART

The use of steam as an aid in reducing the moisture content of filter cake is known in the art. It is further known to construct a rotary disc vacuum filter of a type having a tank with upstanding sidewalls to contain a slurry to be filtered; means for introducing the slurry into the tank; and a disc filter element mounted in the tank for rotation about a horizontal trunnion to continuously pass a portion of the filter element into and out of the slurry in the tank.

To provide the rotary disc vacuum filter with steam assisted drying it is known to mount a hood on the tank of the filter to enclose above the slurry in a chamber a portion of the filter element on which filter cake has formed. Steam is conveyed to the chamber by a steam supply means connected in communication with the hood so that during at least a part of the drying cycle, steam condenses in the filter cake. The condensation of the steam in the filter cake releases heat to lower the viscosity of the water or other liquid contained in the filter cake. The lower viscosity produces better draining efficiency and a reduction of the residual moisture content of the filter cake.

Notwithstanding such teachings of the prior art, previous hoods for providing a chamber in which steam is applied to a filter cake have not provided optimum efficiency with respect to steam introduction to the chamber. Heretofore the steam introduction systems have included piping within the steam chamber. As a consequence, the clearance between the walls of the chamber and the sides of the filter element needed to accommodate not only the filter cake built-up in the slurry and steam circulation in the chamber but also the steam piping. An example of this type of steam hood is taught in U.S. Pat. No. 3,698,556.

The presence of steam piping in the steam chamber is undesirable not only because it requires that the chamber be larger to accommodate the piping but, because the piping provides surfaces on which filter cake can hang up and accumulate. Such cake accumulations can cause clogging of the steam orifices of the piping and interference with the rotation of the disc filter element.

OBJECTS OF THE INVENTION

An object of this invention is to provide for a rotary disc vacuum filter, a hood having a steam chamber and a steam introduction means integral to the walls of the steam hood.

Another object is to provide a hood having a steam chamber allowing a smaller clearance to be provided between the walls of the chamber and the disc filter element.

BRIEF DESCRIPTION OF THE FIGURES

Futher objects and advantages of the invention will be apparent from the following detailed descriptions, taken in conjunction with the accompanying drawings illustrating a preferred embodiment of the invention.

In the drawings.

PREFERRED EMBODIMENT OF THE INVENTION

Figure 1:
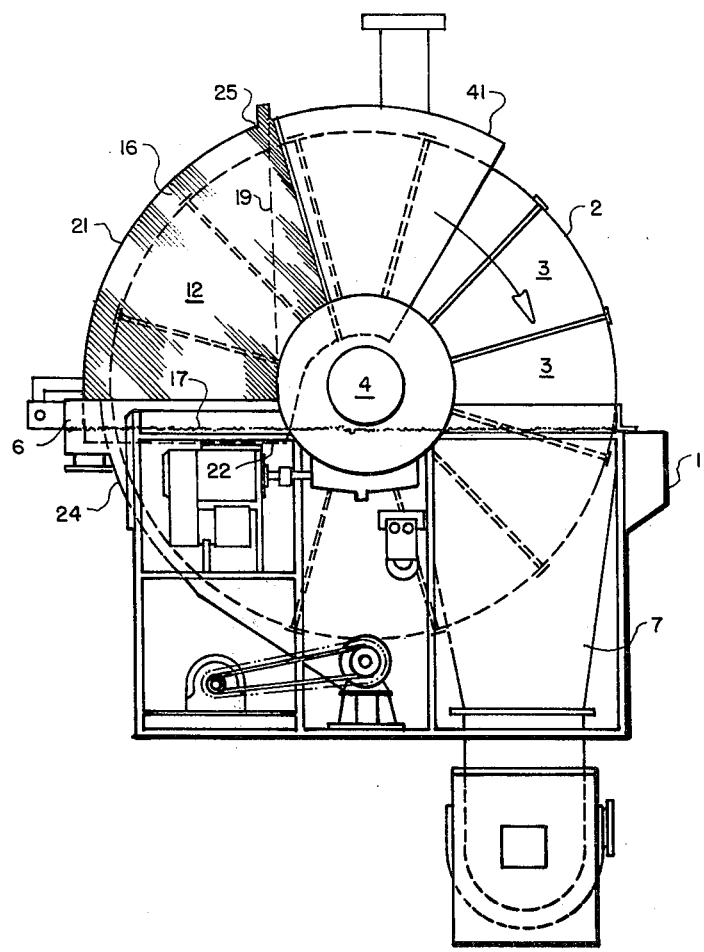
FIG. 1 is a partial side elevation view of a rotary disc vacuum filter with a steam hood according to the present invention.
Figure 2:
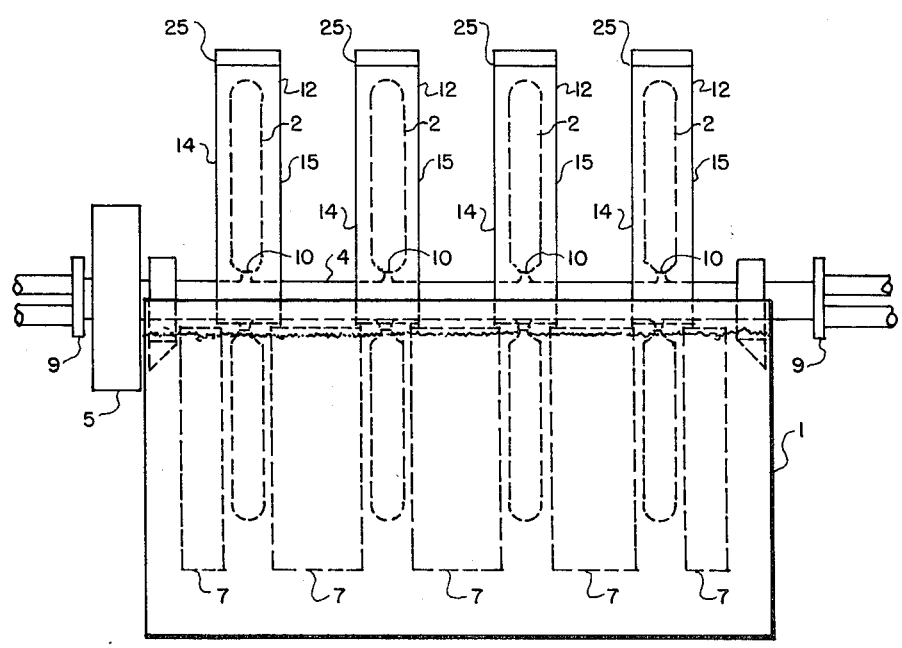
FIG. 2 is a front elevation view of the filter shown in FIG. 1.

Referring to FIGS. 1 and 2, a conventional rotary disc vacuum filter includes a tank 1 with upstanding side-walls to contain a slurry to be filtered. A filter disc 2, which includes a plurality of filter sectors 3, is mounted in a plurality at spaced intervals along a center barrel 4 such that the sectors 3 of each disc 2 are perpendicular to and extend radially from the center barrel 4. The center barrel 4 is rotatably mounted on the tank 1 to rotate about a horizontal axis to sequentially pass the sectors 3 of the discs 2 clockwise as shown in FIG. 1, into and out of the slurry. The center barrel 4 is rotated by a drive unit 5 mounted on the tank 1 as shown in FIG. 2.

To introduce slurry to the tank 1, a launder 6 is mounted on the side of the tank 1 at the slurry surface. To carry filter cake from the tank 1, chutes 7 are mounted in the tank 1 on the side of the tank 1 with respect to the barrel 4 on which the sectors 3 rotate into the slurry. The chutes 7 are positioned on either side of each filter disc 2 to receive filter cake formed on the disc 2.

To carry filtrate from the tank 1, the center barrel 4 includes therein a plurality of longitudinal conduits. Each conduit of the plurality connects in flow communication with a valve unit 9 mounted on the tank as shown in FIG. 2 and has openings 10 spaced at intervals along its length extending radially outward to connect in flow communication with the interior of sectors 3 of different discs 2. The valve unit 9 provides vacuum or pressure through the conduits to the interior of the sectors 3 at different periods in the rotation of the sectors 3. Vacuum is applied while the sectors 3 are submerged in the slurry to cause a filter cake to form on media surfaces of the sectors and to carry filtrate from the tank 1 and also during subsequent drying to dewater the filter cake formed and to carry filtrate including condensed steam from the tank 1. Pressure is applied following drying just before the sectors 3 are resubmerged to dislodge the dewatered filter cake from the sectors 3 into the chutes 7.

Figure 3:
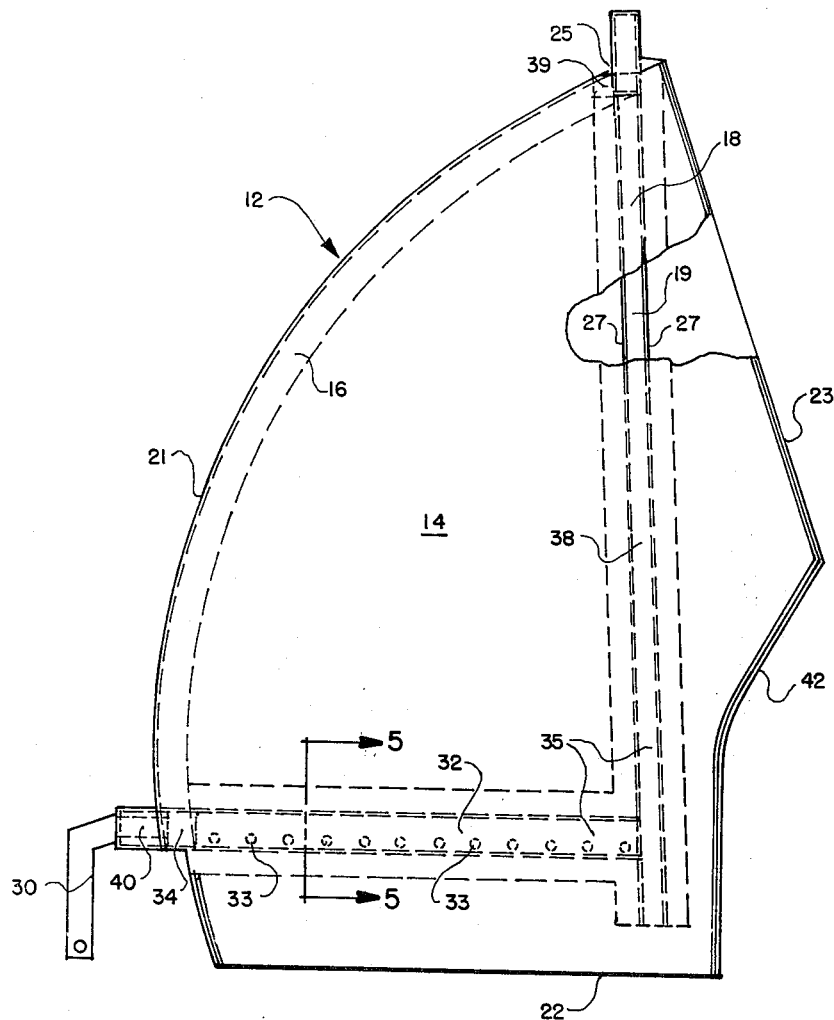
FIG. 3 is a partial side sectional view of the steam hood of FIG. 1.
Figure 4:
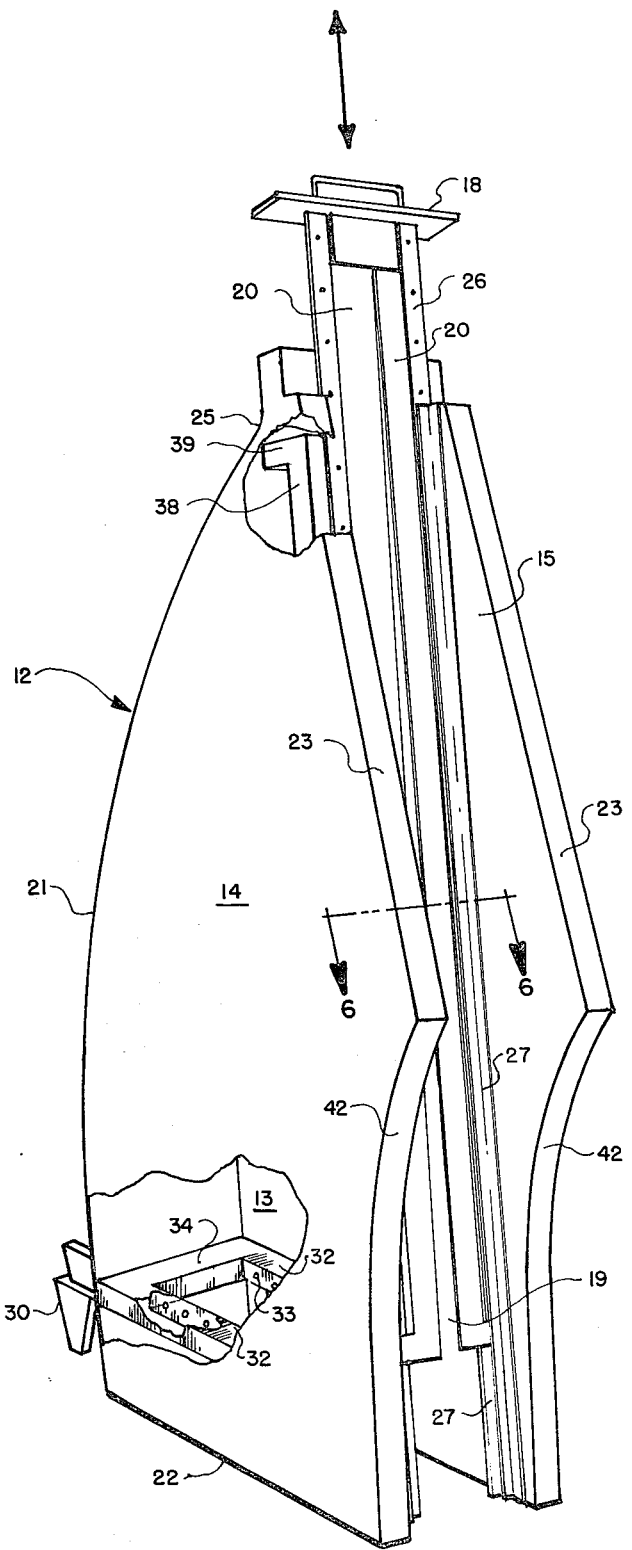
FIG. 4 is a partial perspective view with cutaway of the steam hood of FIG. 1.

A steam hood 12, the focus of this invention, is mounted on the tank 1 over the slurry to define a chamber 13 in which a steam environment is maintained and through which the disc 2 rotatably moves during a portion of the drying cycle of the disc 2 above the slurry. A single steam hood 12 is applied to an individual filter disc 2 as shown in FIG. 2. The steam hood 12, as shown in FIGS. 3 and 4, includes a pair of spaced-apart vertically-extending sidewalls 14 and 15 to define a space through which the media surfaces of the sectors 3 of the disc 2 sequentially pass and a spine wall 16 which sealingly joins the two sidewalls.

An entrance 17 for the hood 12 through which the sectors 3 enter the chamber 13 is formed below the upper edges of the sidewalls of the tank 1 by the slurry surface within the hood 12 enclosed by the interior surface of the sidewalls 14 and 15 and spine wall 16. As so formed, the entrance 17 provides an unconstructed entrance allowing excess slurry and cake on the sectors 3 to return to the slurry.

A seal means 18 for the hood 12 through which the sectors rotatably move to exit the chamber 13, is mounted on the sidewalls 14 and 15 of the hood 12 to define a steam retaining exit 19. The seal means 18 includes two elongated flexible flaps 20 which are mounted to opposite ones of said sidewalls 14 and 15 to sealingly press against cakes of filter solids formed on the surface of the sectors 3 of the disc 2. Preferably, the two flexible flaps 20 extend in a straight line from the spine wall 16 of the hood 12 to below the upper edges of the sidewalls of the tank 1 so as to extend into the slurry contained in the tank 1. The seal means 18 intersects at the slurry surface with the entrance 17 which is defined thereat by the slurry surface. More preferably, the flexible flaps 20 of the seal means 18 extend below the upper edges of the sidewalls of the tank 1 on the side of the tank 1 with respect to the center barrel 4 from which the sectors 3 rotate out of the slurry, such that the center barrel 4 is excluded from the chamber 13. It is also preferred that the flexible flaps 20 extend substantially vertically.

In further detail, the sidewalls 14 and 15 of the steam hood 12 are mounted in parallel to and spaced from either side of the disc 2 to provide sufficient room within the chamber 13 between the sidewalls and the disc 2 to allow filter cake built-up in the slurry to be carried on the media surfaces of the sectors 3 and for steam to circulate within the chamber 13.

The sidewalls 14 and 15 each have a curved portion 21, a bottom edge 22 and a straight edge 23. The curved portions 21 of the sidewalls are substantially concentric with the curve of the outer edge of the filter disc 2 and are joined by the spine wall 16 to enclose the steam chamber 13 at the outer edge of the disc 2. In joining the curved portion 21, the spine wall 16 extends from a tank sidewall 24 to the top 25 of the hood 12 and is curved to be substantially concentric with and spaced from the outer edge of the filter disc 2. The bottom edge 22 of each of the sidewalls extends below the surface of the slurry from the tank sidewall 24 toward the center barrel 4 to form a steam seal along the bottom edge 22 between the chamber 13 and the atmosphere. The straight edge 23 of the sidewalls 14 and 15 is near vertical and extends from the top 25 of the hood 12 toward the center barrel 4.

Figure 6:
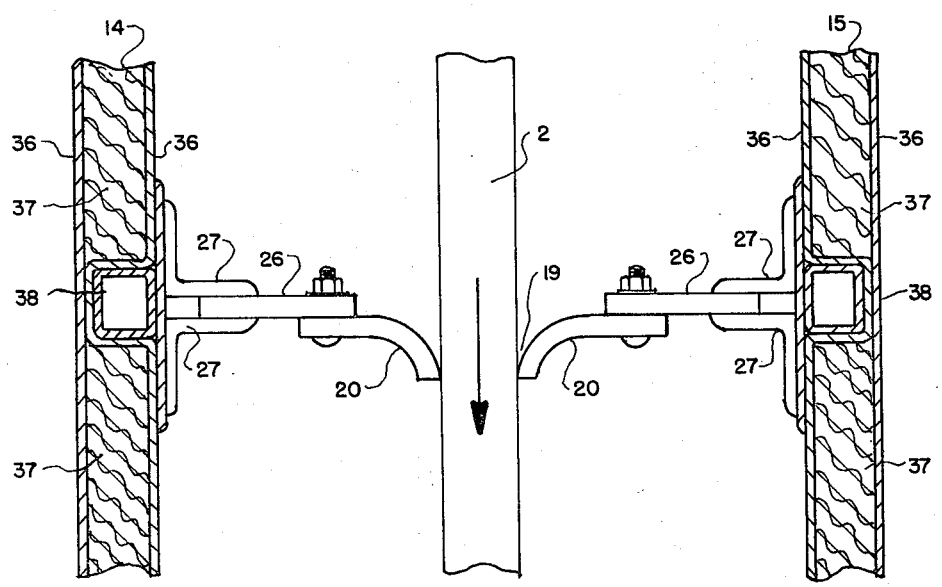
FIG. 6 is a top view of the seal means 18 along line 6—6 of FIG. 4.

The seal means 18 of the hood 12 as shown in FIGS. 3, 4 and 6, includes a U-shaped assembly 26 to which the flaps 20 are bolted. The assembly 26 is slideably mounted in a track defined by a pair of linear guide means which are mounted on opposite ones of the sidewalls 14 and 15 and which extend in a straight line from the spine wall 16 to adjacent the bottom edges 21 of the sidewalls 14 and 15. Each linear guide means includes a pair of guide strips 27. The flaps 20 are preferably positioned in the assembly 26 to overlap each other in the absence of the disc 2, at the top 25 of the hood 12 with a lessening of overlap and then a slight gap at the slurry surface.

A pivot support 30 is attached to the outside of the spine wall 16 of the hood 12 and contacts the tank sidewall 24. The pivot support 30 provides means by which the hood 12 can be tilted back and away from the disc 2.

A steam introduction means according to the present invention is connected in flow communication to the steam hood 12 so as to convey dry steam into the chamber 13 of the hood 12. The steam introduction means as shown in FIGS. 3 and 4, includes a first elongated tubular member 32 which is integral to and connected to support each of the sidewalls 14 and 15 of the hood 12 and which extends from the spine wall 16 along each sidewall toward the seal means 18. Orifices 33 are formed through and spaced along each of the first members 32 between the spine wall 16 and the seal means 18 along the interior surfaces of the sidewalls 14 and 15 to provide flow communication between the first members 32 and the chamber 13. Through the orifices 33, steam is conveyed from the first members 32 to the chamber 13. Preferably the first members 32 extend horizontally and the first members 32 are joined in flow communication by a first tubular joining member 34 which is integral to and connected to support the spine wall 16 and which extends across the spine wall 16. The steam introduction means also includes a pipe 40 connected in flow communication to the first tubular joining member 34 to convey steam therethrough to the orifices 33.

Figure 5:
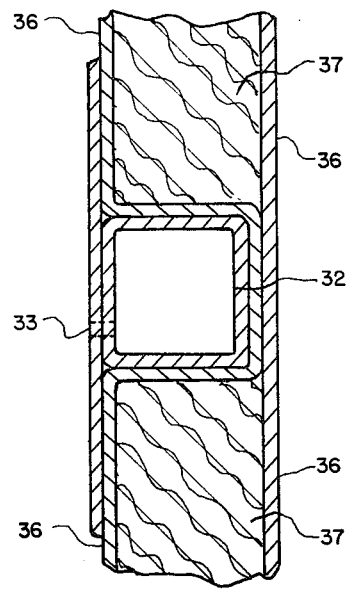
FIG. 5 is a partial sectional view along line 5—5 of FIG. 3.

The first elongated tubular members 32 and the first tubular joining member 34, as shown in FIGS. 3 and 4, are preferably part of an integral tubular frame 35 of metal connected to support the sidewalls 14 and 15 and spine wall 16 of the hood 12 to provide structural strength and minimize distortion problems. As constructed, the sidewalls 14 and 15 and spine 16, as shown in FIG. 5, have double walls 36 with insulation 37 therebetween. Fibreglass is a suitable material for the double walls. The tubular frame 35 also includes integral to and connected to support each of the sidewalls 14 and 15, a second elongated tubular member 38 and integral to and connected to support the spine wall 16, a second tubular joining member 39.

The second elongated tubular members 35 are mounted to extend substantially parallel to the flexible flaps 20 of the seal means 18 from the spine wall to a juncture with their respective first elongated tubular members 32. The second tubular joining member 39 extends across the spine wall 16 and joins the second elongated tubular members 38.

Steam escaping at the seal means 18 of the chamber 13 is captured by an exhaust hood 41. The exhaust hood 41 is mounted over the tank 1 to cover a portion of the disc 2 adjacent the seal means 18.

As part of a seal between the steam hood 12 and the exhaust hood 41, the straight edge 23 of each of the sidewalls 14 and 15 extends increasing outward from the seal means 18 as the sidewalls extend down from the top 25 of the hood 12 to a point approximately midway to the slurry surface. From this point, the sidewalls have a curved portion 42 which extends back toward the slurry surface at the seal means 18. The curved portion 42 is concentric in part with and spaced from the center barrel 4.

In operation, a slurry to be filtered is introduced into the tank 1 through the launder 6 and the center barrel 4 rotates the filter disc 2. Vacuum is applied to the interior of the filter sectors 3 of the disc 2 as the sectors 3 enter the slurry and a filter cake forms on the media surfaces of the sectors 3. As the disc 2 rotates, the sectors 3 emerge from the slurry and proceed through the steam chamber 13 of the hood 12 from the entrance 17 to the exit 19. In the chamber 13, a steam environment is maintained by injection of dry steam by the steam introduction means through the orifices 33. The sectors 3 exit the chamber 13 and at a point adjacent the chutes 7 the vacuum is replaced by pressure. The pressure causes the filter cake to discharge into the chutes 7. The sectors 3 then reenter the slurry, at which point vacuum is again applied to the sectors 3 and the cycle is repeated.

As an example of operation rates, for a steam hood 12 fitting a disc 2 having a diameter of eight feet and ten inches, twenty pounds of steam per hour is provided to the hood 12. In filtering iron ore, this is roughly equivalent to 100 pounds of steam per ton of iron ore. An approximate velocity of 50 feet per second is maintained at the orifices 33 which admit the steam to the chamber 13. A possible orifice configuration is to have twenty-two orifices of three-quarter inch diameter spaced along each of the horizontal tubular members 32.

We claim:

1. In a rotary disc vacuum filter for steam-assisted pressure differential filtration, the filter having a tank with upstanding sidewalls so as to contain slurry to be filtered; a disc filter element mounted in the tank for rotation about a horizontal trunnion so as to pass into and out of the slurry in the tank; and a hood mounted on the tank to define a chamber for a single disc filter element and through which the disc filter element rotatably moves, the hood having a pair of spaced-apart vertically-extending sidewalls to define a space through which sectors of the disc filter element sequentially pass, a spine wall which sealingly joins the pair of sidewalls, and a seal means mounted on the sidewalls of the hood to define a stream-retaining exit for the chamber, the seal means including two elongated flexible flaps which are mounted to opposite ones of the sidewalls so as to sealingly press against cakes of filter solids formed on the surface of the sectors of the disc filter element, an improved introduction assembly connected in flow communication to the hood for conveying steam into the chamber comprising first and second elongated tubular members each of which is connected to support one of the pair of sidewalls as an essential element of a tubular frame which is the sole support for the hood and each of which extends from the spine wall along the sidewall towards the seal means and comprising orifices formed through and spaced along each of said elongated tubular members between the spine wall and the seal means to provide flow communication between said elongated tubular members and the chamber.

2. An improved introduction assembly according to claim 1 wherein said elongated tubular member extends substantially horizontally.

3. An improved introduction assembly according to claim 1 further including a tubular joining member which is connected to support the spine wall and which extends across the spine wall to join in flow communication said elongated tubular members of the sidewalls.

4. An improved introduction assembly according to claim 1 further including a pipe connected to said tubular joining member for conveying steam to said orifices.

5. An improved introduction assembly according to claim 1 wherein said first and second elongated tubular members extend within their respective sidewalls.

* * * * *